United States Patent Office 3,078,926
Patented Feb. 26, 1963

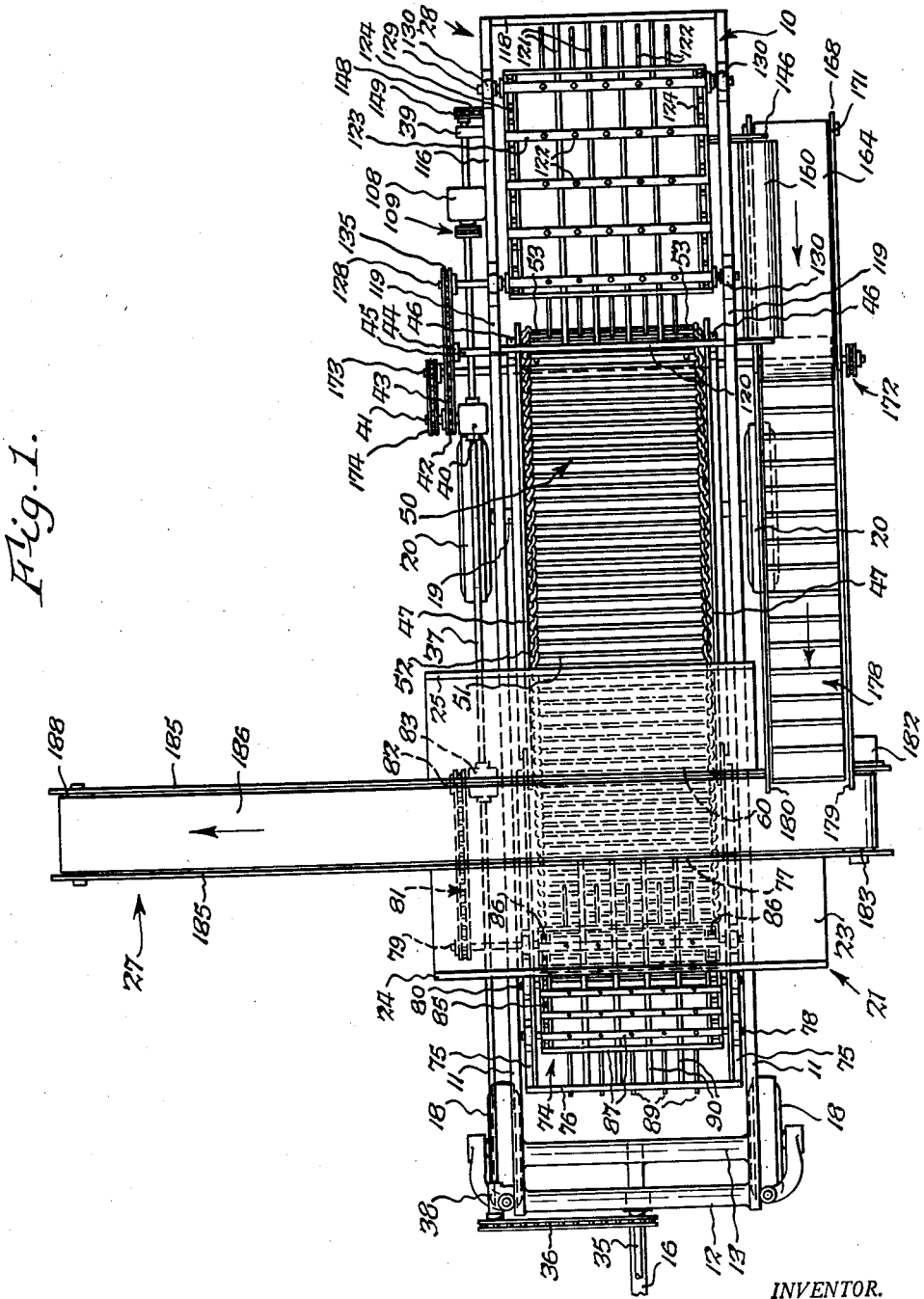

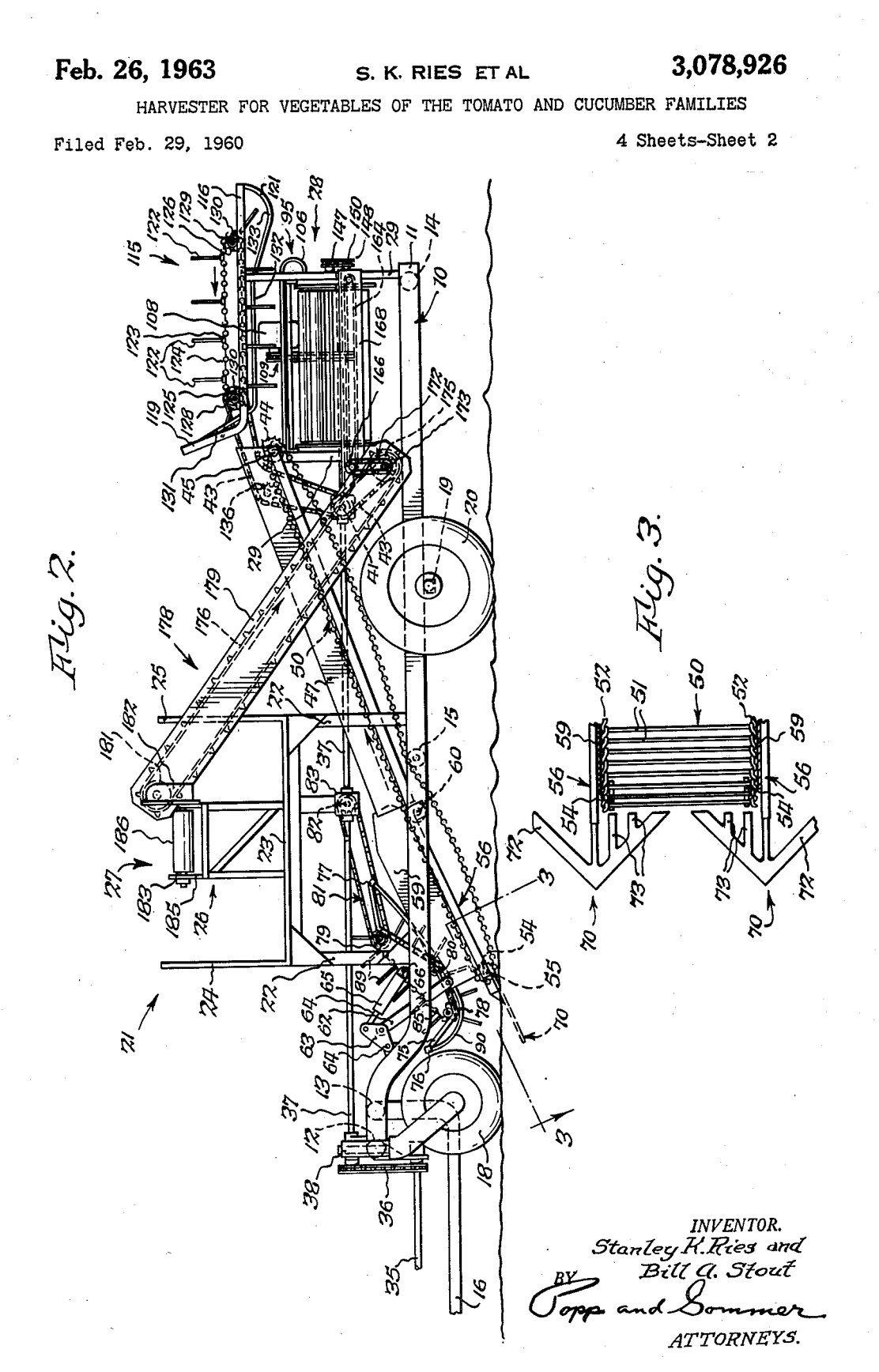

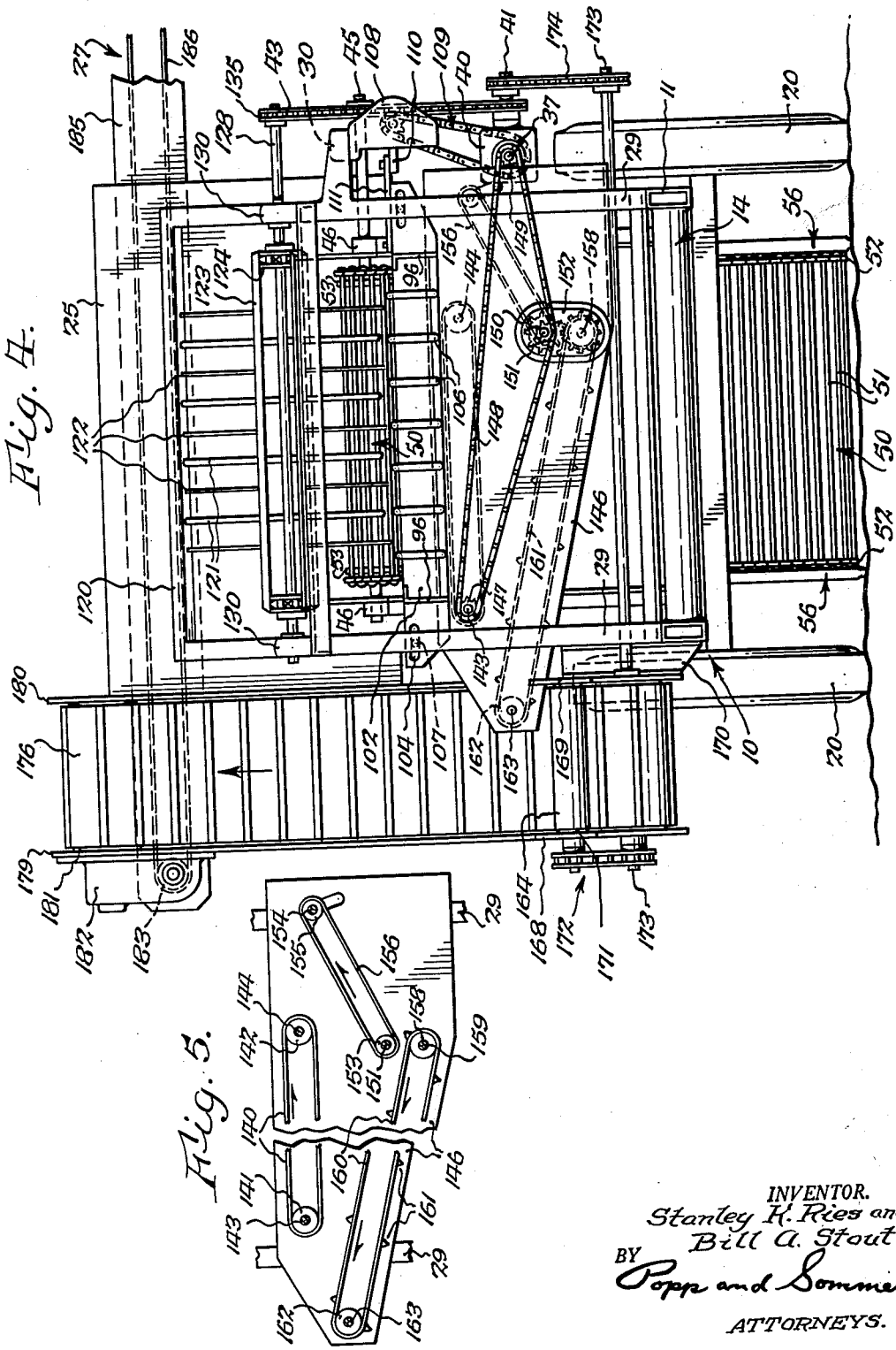

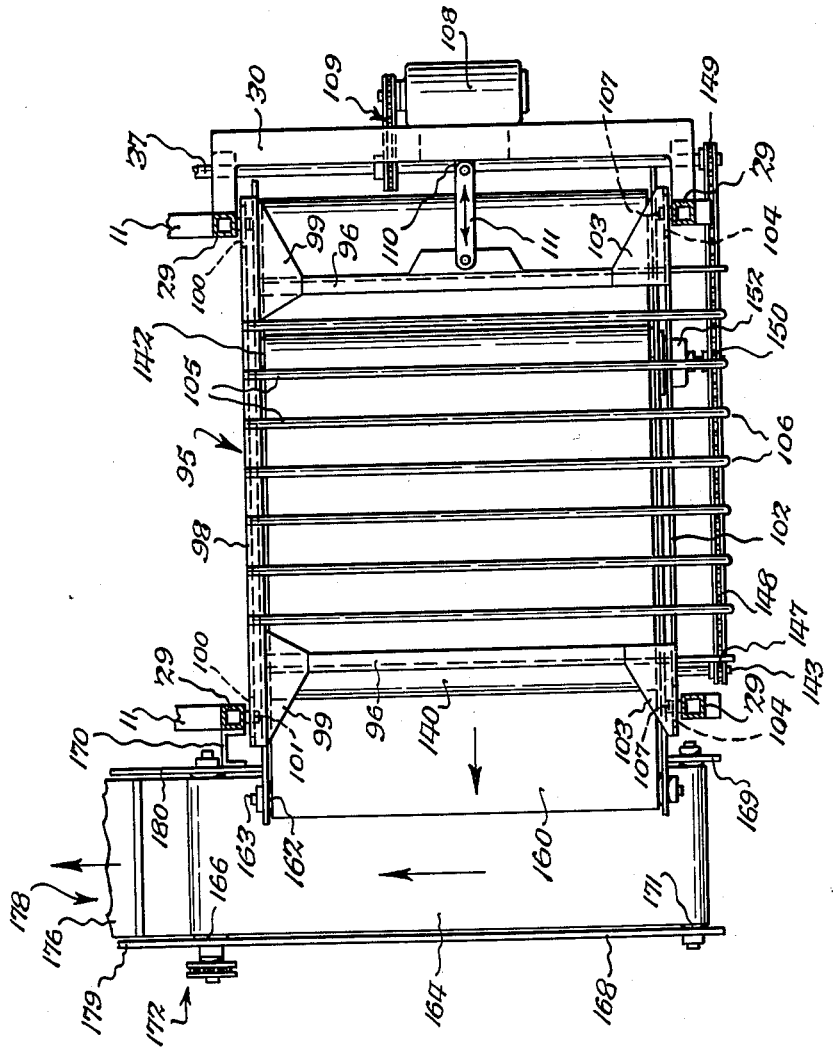

3,078,926
HARVESTER FOR VEGETABLES OF THE TOMATO
AND CUCUMBER FAMILIES
Stanley K. Ries, 1071 Lilac, and Bill A. Stout, 1050
Daisy Lane, both of East Lansing, Mich.
Filed Feb. 29, 1960, Ser. No. 11,655
4 Claims. (Cl. 171—14)

This invention relates to a harvester for vegetables of the tomato family (also peppers and eggplant) and of the cucumber family (also melons, squash and pumpkins) and is more particularly shown in the form of a mobile tomato harvester which is propelled through the tomato field, preferably lengthwise of the rows, and which removes the tomatoes from the vines, separates the tomatoes from leaves or trash, and discharges the harvested tomatoes into a suitable transport for delivering the same to the cannery or other place of further processing.

Such mobile field harvesters have been successfully employed with relatively rugged vegetables, such as potatoes, where not only are the potatoes of such rugged nature as to withstand relatively rough handling, but also where the vines of ripe potatoes are dead and separate from the potatoes very easily. However, such is not the case with tomatoes growing on their plants. The tomatoes are very soft and delicately skinned as compared with potatoes and are extremely sensitive to rupture or cracking and bruising. The tomato is a perennial plant and hence the plant is vigorously alive and tenaciously adheres to even ripened tomatoes so that suitable force is required to sever the tomatoes from the plants, especially as compared with potatoes where the vines are dead and tend to fall away. This relatively tenacious adherence of the vegetables to the plant is also true of other members of the tomato family (Solanaceae) and the cucumber family (Cucurbitaceae).

These difficulties with the harvesting of tomatoes have heretofore resisted the efforts to provide a satisfactory tomato harvester.

It is accordingly the essential object of the present invention to provide a harvester which will remove vegetables of the tomato and cucumber families from vigorously growing vines to which the vegetables are firmly adherent without substantial injury to the vegetables, especially without such injury to tomatoes as would disqualify them by bruising or rupture of the delicate tomato skin and internal structure.

Another important object of the present invention is to provide such a harvester in which the subsequent handling of the separated vegetables, especially with tomatoes, is such as to avoid bruising, rupturing or injury to the vegetables.

Another object of the invention is to provide such a harvester which is mounted on traction wheels and is drawn through the vegetable field, and which deposits the threshed plants back on the field to be subsequently plowed under.

Another object of the invention is to provide such a harvester in which leaves or other trash are removed from the harvested vegetables.

Another object is to provide such a tomato harvester in which provision can be made for a number of persons to act as sorters in removing any unwanted vegetables or foreign matter from the stream of vegetables passing through the harvester.

Another object is to provide a tomato harvester from which the harvested tomatoes are not noticeably different from hand harvested fruit.

Another object is to provide such a harvester which will pick up loose vegetables on the ground.

Another important object of the invention is to provide such a harvester which is of rugged and simple construction and which will stand up under conditions of severe and constant use without getting out of order or requiring adjustment or repair.

Another important object of the invention is to provide such a tomato harvester which can be produced at a low cost considering the function which it performs, and which will be fully competitive with the hand picking of similar vegetables as now practiced.

Other objects and advantages of the invention will be apparent from the following description and drawings in which:

FIG. 1 is a top plan view of a tomato harvester embodying the present invention.

FIG. 2 is a side elevational view thereof.

FIG. 3 is an enlarged fragmentary top plan view of a portion of the plant cutter and elevating conveyer of the harvester, this view being taken generally along line 3—3, FIG. 2.

FIG. 4 is an enlarged rear elevational view of the harvester with a part of the top sorting and discharge conveyer broken away.

FIG. 5 is a fragmentary vertical section taken generally on line 5—5, FIG. 4.

FIG. 6 is an enlarged horizontal section taken generally on line 6—6, FIG. 4.

The tomato harvester of the present invention is propelled through the field of tomatoes to be harvested and for this purpose is shown as including a frame or chassis 10 having a pair of main longitudinal side frame bars 11 rigidly connected at their front ends by a pair of cross tubes 12 and 13 and at their rear ends by a cross tube 14, these main longitudinal side frame bars also being rigidly connected by at least one intermediate cross tube 15. A draw bar 16 is fixed to and projects horizontally forward from the frame cross tube 13 and the front end of the frame is supported by a pair of caster wheels 18 so that as the rigid draw bar 16 is moved from side to side these caster wheels turn to permit corresponding movement of the front end of the chassis or frame. The rear end of the frame or chassis 10 is supported by an axle 19 which in turn is supported at its opposite ends by rear wheels 20.

Toward its front end the frame or chassis 10 carries an elevated platform structure indicated generally at 21. This is shown as comprising four posts 22 fixed to and rising from the main longitudinal side frame bars 11 in rectangular arrangement and supporting a platform 23 which can have front and rear rails 24 and 25 extending transversely of the harvester. At its center this platform is shown as supporting a bench-like support 26 for a horizontal grading and discharge belt conveyer indicated generally at 27 and hereinafter described in detail.

At its rear end the frame or chassis 10 carries a supporting structure indicated generally at 28 for a shaking mechanism for separating the tomatoes from the plants. This supporting structure is shown as comprising four posts 29 fixed to and rising from the main longitudinal side frame beams 11 and suitably connected by at least one horizontal side bar 30 and by suitable transverse bars, as hereinafter described, to provide a rigid structure.

Power for operating the moving parts of the tomato harvester is derived from a power-take-off shaft 35 suitably journalled on the front cross bar 12 and projecting forwardly therefrom for connection to the power take-off (not shown) of the tractor drawing the harvester through the tomato field. This power take-off shaft 35 is connected by a chain drive 36 with a main longitudinal horizontal power shaft 37 suitably journalled in bearings 38 and 39 at the front and rear end of the frame, respectively, at one side thereof.

Above the corresponding rear wheel 20 the main horizontal drive shaft 37 extends through a miter gear box 40 having a horizontally projecting driven stub shaft 41 carrying a fixed sprocket 42. Through a drive chain 43, this sprocket drives a sprocket 44 on a cross shaft 45 journalled in bearings 46 mounted on the front end of the elevated supporting structure 28 at the rear of the harvester. This shaft extends through fixed side walls 47 for a bar conveyer indicated generally at 50. This bar conveyor 50 comprises a plurality of transversely spaced conveyer bars 51 each bent at its opposite ends to interlink with the bent ends 52 of the next succeeding bar 51 and form an endless chain of spaced bars 51 as best shown in FIG. 3.

The chain of spaced conveyer bars 51 pass over a pair of coarse toothed drive sprockets 53 fixed to the drive shaft 45 and the teeth of which enter the spaces between the bars 51 as best shown in FIG. 4. The lower return or inoperative stretch of the bar conveyer 50 is shown as supported by the frame cross tube 15 and as passing around a pair of coarse toothed sprockets 54 on a cross shaft 55. This cross shaft 55 is journalled at the forward end of a frame 56 having side walls 59 which form continuations of the side walls 47. This frame 56 is pivotally supported on a cross shaft 60 carried by the main frame of the harvester.

The forward end of each side wall 59 is supported by a link 62 the other end of which is pivotally connected to the center of a bell crank lever 63 having one end pivotally connected to the corresponding main longitudinal side frame beam 11 as indicated at 64. The outboard end of the lever 63 is connected to the piston and piston rod 64 of a hydraulic cylinder 65 the opposite end of which is pivoted to the corresponding main longitudinal side frame beam as indicated at 66. The arrangement of these links, levers and hydraulic cylinders is such that upon introducing hydraulic fluid under pressure into the blind end of the cylinders 65 their piston rods 64 are projected and the linkage moved so as to elevate the front end of the frame 56 pivotally supported on the cross rod 60.

Suitably fixed to the lower end of the frame 56 at opposite sides thereof are a pair of cutters indicated generally at 70. As best shown in FIG. 3 each cutter bar comprises a shank or stem fixed to the corresponding side of the frame 56 to project downwardly from its lower forward end and each carrying a V-shaped blade 72 which is arranged to work underground and sever the tomato plants from their roots below ground. Desirably the portions of each V-shaped blade in front of the bar conveyer 50 can have rearwardly and upwardly projecting fingers 73 which serve to insure the elevation of the cut tomato plants onto the upper stretch of the endless bar conveyer 50.

Further to insure loading of each tomato plant onto the endless bar conveyer 50 after it has been severed from its roots, an overhead gathering device 74 is provided which is preferably constructed as follows:

The numeral 75 represents a bar suitably secured to the main frame or chassis 10 of the harvester at each side thereof in transverse alinement with each other. Each of these bars is of somewhat sinusoidal or irregular form to support cross bars and cross shafts at the different positions shown in FIG. 2. Thus the front ends of these side bars 75 are rigidly connected by horizontal cross bar 76 and the rear ends by horizontal cross bar 77. On these side bars 75 are also journalled a front, rear and intermediate cross shaft 78, 79 and 80 respectively. The rear cross shaft 79 is driven by a sprocket and chain drive 81 from a driven stub shaft 82 projecting outwardly from a miter gear box 83 through which the main longitudinal drive shaft 37 extends and forms the power source. A pair of endless conveyer chains 85 are driven from sprockets 86 fixed to the shaft 79, these chains also travelling over idler sprockets on the cross shafts 78 and 80. The pair of chains 85 are cross connected by bars 87 which carry radially outwardly projecting rods or fingers 89.

As this rod conveyer passes around the idler pulleys of the foremost and lowermost cross shaft 78 these rods or fingers travel in a radial position with reference to the cross shaft 78 and move downwardly thereby to force down the tops of the tomato plants being severed from their roots and to insure that these plants are not permitted to move transversely and escape being severed by the underground blades 70. In the lower stretch of the bar conveyer, these fingers 89 travel rearwardly along with and at the same speed as the bar conveyer 50 thereby to insure that the tomato plants so forced downwardly while passing the cutter blades 70 move upwardly onto the upper operative stretch of the bar conveyer 50. The transverse drive shaft 79 of the overhead gathering device 74 is arranged so that the fingers 89 withdraw upwardly from the bar conveyer 50 and these fingers also withdraw upwardly between stripper bars 90 which strip any plant parts or other foreign material from the fingers or rods 89. These rods 90 are arranged in parallel relationship lengthwise of the line of movement of the harvester and are fixed at their front ends on the cross bars 76 and at their rear ends to the cross bars 77. These cross bars are arranged so that each row of the fingers 89, lengthwise of the line of movement of the harvester, passes through a space between these bars so as to provide this stripping action.

The rod conveyor 50 deposits the tomato plants upon a shaking grid indicated generally at 95 and which is preferably constructed as follows:

The numeral 96 represents a pair of horizontal side bars extending lengthwise of the line of movement of the harvester and of angle form in cross section. At their forward ends these side bars are rigidly connected by a cross bar 98, suitable gussets 99 being provided for rigidity. A horizontal longitudinal slot 100 is provided in each end of this cross bar 98 and this cross bar 98 is supported by a pin 101 projecting from the corresponding post 29 into each of these slots 100. It will be seen that this mounting of the cross bar 98 on these pins 101 permits longitudinal reciprocating movement of the bar 98 transversely of the line of movement of the harvester.

The rear ends of the longitudinal side bars of the shaking grid or frame 95 are rigidly connected together by cross bar 102 in the form of a vertical plate of substantially greater depth than the cross bar 98 at the front of the shaking frame or grid. The frame or grid is also preferably stiffened by horizontal gusset plates 103 at its rear corners between the side bars 96 and cross plate 102 and the cross plate 102 is supported by pins 107 projecting forwardly from the posts 29 into horizontal longitudinal slots 104 provided in the cross plate 102.

The grid or frame 95 is completed by a series of parallel spaced grid bars 105 extending lengthwise of the line of movement of the harvester. An important feature of the invention is that these rods 105 are of large diameter to avoid cutting the delicate tomato plants. These rods are preferably in the order of five eights inch outside diamter. The rear end of each of these bars 105 is secured, as by welding, to the top of the cross bar 98 and the rear end of each of these bars is secured, as by welding, to the top of the cross plate 102. In addition, each of the bars 105 is extended rearwardly to provide a downwardly curving return bend 106 and the lower extremity of this return bend is secured to the bottom of the cross plate 102.

The pin and slot mounting for the frame or grid 95 at each of its four corners permits horizontal reciprocation of the horizontal frame or grid transversely of the bars 105 and the line of movement of the harvester. Such reciprocation is effected by a shaker indicated generally at 108 shown as mounted on the longitudinal frame bar 30 of the elevated structure 28 and as driven through a sprocket and chain drive 109 directly from the main longitudinal drive shaft 37 as best shown in FIG. 6. The operating part 110 of this shaker is connected by a link 111 with the corresponding side bar 96 of the shaker frame or grid. The shaker 108 is selected to reciprocate the grid or frame 95 approximately 175–200 cycles per minute and with an amplitude or throw of about 4 inches. The spacing of the bars 105 is such as to permit tomatoes of maximum size to settle downwardly among these bars in response to such shaking movement.

An important feature of the invention resides in the overhead conveyor for the vines passing over the shaking grid 95. This overhead conveyor, indicated generally at 115, comprises a pair of horizontal side frame bars 116 extending lengthwise of the direction of travel of the harvester and forming the top side bars of the supporting structure 28 rising from the rear of the harvester chassis. The rear ends of side bars 116 are rigidly connected by a cross bar 118 and the front ends 119 are bent upwardly and have their upper ends rigidly connected by a cross bar 120. Parallel spaced stripper rods 121 are fixed at their front and rear ends to the front and rear cross bars 120 and 118, respectively, these rods serving to strip clinging parts of plants from the rods or fingers 122 of the overhead conveyor. These conveyor rods or fingers 122 are fixed to each of a series of cross rods 123 to project outwardly therefrom and the opposite ends of each rod is fixed to an endless chain 124 in such manner that the conveyor rods or fingers 122 radiate outwardly. These chains 124 are carried by sprockets 125 and 126 on a drive shaft 128 and driven shaft 129, respectively, extending transversely of the harvester and journalled in bearings 130 on the frame bars 116. The parallel stripper rods 121 have upstanding front parts 131 among which the conveyor fingers 122 pass in travelling downwardly around the front sprocket 125. These parallel stripper rods 121 have horizontal portions 132 over the shaking grid 95 so as to have no stripping action while the plants are being forced by the conveyor rods or fingers 122 along the shaking grid. These parallel stripper rods 121 also have depending curved or downwardly looped rear ends 133 which extend beyond the shaking grid 95 and between which its conveyer fingers or rods 122 gradually retreat upwardly as they approach the rear extremity of the lower stretch of the endless conveyor chains 124.

The overhead conveyer 115 is driven through a sprocket 135 at one end of its drive shaft 128, the chain 43 passing around this sprocket in addition to passing around the drive sprocket 42 and main elevating conveyor sprocket 44 as previously described, as well as an idler sprocket 136 as shown in FIG. 2.

The tomatoes on plants conveyed along the bars 105 of the shaking grid 95 by the overhead conveyer 115 settle downwardly between these bars due to the transverse reciprocating movement of these bars and when they reach a pendant position they are forcibly separated from the plants due to the inertia of the tomatoes. These picked tomatoes fall on the upper stretch of a horizontal endless conveyor belt 140 supported between two rollers 141, 142 on a drive shaft 143 and idler shaft 144 respectively. This belt 140 is made of rubber or other soft resilient material to cushion the fall of the tomatoes thereon. These shafts extend longitudinally of the harvester and are suitably journalled at their opposite ends in vertical transverse plates 146 fixed to the corner posts 29 of the structure 28 rising from the rear of the chassis 10. A sprocket 147 fixed to the rear end of the drive shaft 143 is connected by a chain 148 to a sprocket 149 fixed to the extreme rear end of the main horizontal drive shaft 37. This chain 148 also passes around and drives a sprocket 150 fixed to the shaft 151 which extends through a gear box 152 and also carries a roller 153 fixed to this shaft and arranged between the vertical cross plates 146 which support this gear box and shaft.

These vertical cross plates 146 also journal the opposite ends of a shaft 154 carrying a roller 155, the rollers 153 and 155 jointly supporting an endless scavenging belt 156 the inclined, upwardly moving upper stretch of which is arranged under the discharge end of the horizontal conveyor belt 140. This belt 156 is also preferably made of rubber or other soft resilient material.

The driven shaft 158 of the gear box 152 is arranged below and parallel with the roller 153 and carries a drive roller 159 for an endless belt 160, this last roller and endless belt also being arranged between the vertical cross plates 146 mounted on the posts 29. This belt is preferably made of rubber or other soft, resilient material and is cleated, as indicated at 161, and its inclined upper stretch receives the tomatoes from the lower end of the scavenging belt 156 and passes over an idler roll 162 on a shaft 163 to deposit the tomatoes on the upper stretch of an endless horizontal side conveyor belt 164 of rubber or other soft resilient material which travels lengthwise of the harvester. For this purpose the forward drive roller 166 for this belt is suitably journalled in a conveyor belt frame including side plates 168 and 169 secured by brackets 170 to the posts 29 of the upright supporting structure 28 and the rear idler roller 171 for this belt is journalled between the rear ends of these side plates 168, 169. The roller 166 has a sprocket and chain drive connection 172 with a cross shaft 173 which, as best shown in FIG. 4, extends to the opposite side of the harvester where it has a sprocket and chain connection 174 with the driven stub shaft 41 of the gear box 40.

The drive roller 175 for a slatted belt 176 of an elevating conveyor is fixed to this cross shaft 173, which shaft is arranged below the front end of the horizontal belt 164 so that the tomatoes discharged from this front end are discharged upon the slatted belt 176. This slatted belt forms part of a conveyor indicated generally at 178 which has a frame including a pair of side plates 179 and 180 suitably secured to the lower part of the supporting structure 28 for the shaking mechanism and the upper part of the platform structure 21. The upper part of this belt passes around a roller 181 which, through gearing contained within a gear box 182, drives the drive roller 183 of the horizontal cross conveyor 27 mounted on the bench-like support 26 on the platform 23. This horizontal cross conveyor 27 includes side plates 185 in which the drive roller 183 is journalled and an endless belt 186 passing around this roller and also an idler roller 188 journalled at the ends of the side plates 185 opposite from the drive roller 183. Space is provided on the platform 23 on opposite sides of this cross conveyor 27 for people acting as sorters to remove unwanted material from the stream of tomatoes passing along on the upper stretch of the belt 186. From the outboard discharge end of this belt the tomatoes can be received by any suitable mechanism (not shown) for transport from the tomato field.

*Operation*

In the operation of the tomato harvester it will be assumed that a farm tractor (not shown) is attached to the draw bar 16 and is propelled through the tomato field lengthwise of the rows of tomato plants therein and which plants have a crop of harvestable tomatoes. It will also be assumed that the power input shaft 35 of the harvester is connected to the power take-off of the tractor so that the various belts and chains are moved in the direction of the arrows shown in the drawings. It will also be assumed that the piston rods 64 of the hydraulic cylinders 65 have been adjusted so that, through the bell crank levers 63 and links 62, the forward end of the frame 56 carrying the cutters 70 and lower sprockets 54 of the bar conveyor 50 is held at such elevation that its cutting blades 70 are arranged below the earth so as to sever the tomato plants, below ground, from their roots as the harvester moves along the tomato field.

As soon as the tomato plants are so cut from their roots by the blades 72, the rods or fingers 89, radiating from the cross bars 87 of the endless chain overhead conveyor 74, and emerging from the spaces between the stripper bars 90, descend upon these cut tomato plants and draw them rearwardly onto the bar conveyor 50. It will therefore be seen that the rods or fingers 89 act in the manner of an overhead sweep to insure the transfer of the cut tomato plants from the ground onto the upwardly moving upper stretch of the bar conveyor 50. These fingers also sweep any tomatoes on the ground onto the bar conveyor 50.

This upper stretch of the bar conveyor 50 discharges the plants with the tomatoes attached thereto onto the forward ends of the bars 105 of the shaking grid or frame 95, these bars extend lengthwise of the harvester, and the grid being supported at its four corners on the pins 101 and 103 which enter the horizontal transverse slots 100 and 104 so that the entire grid or frame can be reciprocated in a horizontal plane transversely of the harvester. It will particularly be noted that this shaking grid or frame is composed of rigidly connected side bars 96 and cross bars 98, 102 to which latter the spaced rods 105 are also rigidly connected, thereby to provide a structure having adequate strength and rigidity to separate the tomatoes from the plants in spite of the relatively tenacious adherence of the tomatoes to the plants. This shaking grid or frame 95 is reciprocated transversely of the harvester and, in particular, transversely of its spaced rods 105 by the shaker 108 which is secured to the frame and which has its reciprocating part 110 connected by the link 111 to the shaking grid or frame 95 as best illustrated in FIG. 6.

The rods 105 are desirably arranged in a horizontal plane and the movement of the tomato plants lengthwise of these rods is effected by the overhead conveyor 115. This overhead conveyor is of the chain 124 and cross bar 123 type having rods or fingers 122 radiating from the cross bars and the plants discharged from the upper end of the bar conveyer 50 onto the forward ends of the rods 105 are immediately engaged by the successive rows of descending fingers or rods 122 of this overhead conveyer 115. These rods are emerging from the spaces between the stationary stripper bars 121 and descend upon the plants leaving the bar conveyer 50 and propel them lengthwise of the bars 105 of the reciprocating shaker grid 95. These bars are reciprocating transversely, desirably at an amplitude in the order of 4 inches and at a frequency in the order of 175–200 cycles per minute and as the plants with their heavy tomatoes come upon these reciprocating bars 105 the tomatoes, because of their weight, immediately begin to settle through the spaces between the bars 105 and to assume a pendant position. When this occurs, due to the inertia of the pendant tomatoes in resisting the reciprocation of the vines on the grid 95, the tomatoes are torn from the plants and drop onto the upper stretch of the transverse rubber conveyor belt 140. This shaking grid mechanism is effective even with tomatoes which are very small and green and hence which tenaciously adhere to the plants and the effective length of the grid bars 105 is selected so that all the tomatoes on the plants passing thereover have adequate opportunity to settle through the plants and through the openings between the grid bars 105 to assume a pendant position.

The threshed vines are moved by the depending rods or fingers 122 of the overhead conveyor 115 beyond the downwardly curving return bends 106 of the rods 105 and fall to the ground in rear of the harvester. The depending fingers 122 so discharging the threshed vines from the harvester retreat through the spaces between the stripper bars 121, the rear ends of which have the downwardly bent portions 133 for this purpose. In doing so many plants wound around or otherwise tending to cling to the radiating rods or fingers 122 of the overhead conveyor 115 are stripped therefrom to join the threshed plants falling to the ground from the rear end of the harvester.

It will be noted that the tomatoes depending from the bars 105 of the shaking grid 95 fall but a very short distance onto the upper stretch of the horizontal rubber conveyer belt 140 which moves the tomatoes and drops them upon the upper stretch of the inclined conveyer belt 156. This conveyer belt is arranged at an angle greater than the angle of repose of the tomatoes but less than the angle of repose of leaves and other trash and its upper stretch travels upwardly. Accordingly the tomatoes roll downwardly upon the upwardly moving stretch of this belt 156 while the trash and debris falling on this belt travel upwardly and fall from this belt as it passes around its upper roller 155.

The tomatoes leaving the lower end of the upwardly moving stretch of this conveyer belt 156 fall upon the upper stretch of the slatted conveyer belt 160 which drops the tomatoes upon the upper stretch of the horizontal side conveyer belt 164, this upper stretch moving toward the front end of the harvester. This side conveyer belt 164 discharges the tomatoes upon the upper stretch of the slatted conveyer belt 176 which continues the movement of the tomatoes toward the front end of the harvester and also lifts them to the bench-like structure 26 on the elevated platform 23. The slatted conveyer belt 176 discharges the tomatoes onto the horizontal cross conveyer belt 186 which moves the tomatoes on the bench-like structure 26 along the center of the platform 23 and discharges them from the opposite side of the harvester into any form of mechanism (not shown) for transporting the tomatoes to the cannery or other place of further processing. The platform 23 can support a number of people standing on opposite sides of the horizontal belt 186 who act as sorters in removing any unwanted material or damaged or unwanted tomatoes from the stream being conveyed upon this belt 186.

The operation of the harvester on tomatoes is particularly characterized by freedom from bruising and cracking. This lack of bruising and cracking is in large measure due to the protection given to the tomatoes by their plants during the movement of the plants up the first inclined conveyer and over the grid bars 105 of the shaking grid 95. This protection is in large measure due to the tenacity which even ripe tomatoes adhere to their stems and which tenacity has heretofore been the principal problem in machine harvesting tomatoes. This protection and also complete harvesting of the crop is also insured by the rigidly framed grid 95 which, although reciprocating at 175–200 cycles per minute with a throw of 4 inches, merely operates to first cause the tomatoes to settle through the mat of plants and between the grid bars 105 until they reach a free hanging pendant position where they are immediately severed from the plants due to their inertia and the lateral throw and frequency of the grid bars 105. The freedom from bruising and cracking is also due to the subsequent handling of the harvested tomatoes, they being gently dropped a short distance onto the endless belt 140 of soft resilient material and being subsequently handled by the similar soft resilient endless belts 156, 160, 146, 176 and 186. In each transfer from belt-to-belt, the tomatoes drop but a short distance thereby further to avoid injury.

While because of their thin skin and delicate pulpy internal structure the present harvester is particularly directed toward the harvesting of tomatoes, herein referred to as a vegetable, the harvester can also be used for the other vegetables noted, namely, other members of the tomato family and cucumber family.

We claim:

1. In a harvester for vegetables of the tomato and cucumber families and which are growing on their plants, a supporting structure, a plurality of generally horizontal and parallel grid bars transversely spaced to provide jointly a support for said plants a distance sufficient to permit the vegetables on said plants to settle therethrough, means connecting opposite ends and extending along opposite sides and lengthwise of said grid bars to form a grid, means feeding a succession of said plants bearing said vegetables onto one end of said grid in a direction generally lengthwise of said grid bars, overhead conveyer means arranged above said grid and engaging and continuing the movement of said plants bearing said vegetables lengthwise of said grid bars, means supporting said grid on said supporting structure for horizontal reciprocation transversely of said bars, means arranged to reciprocate said grid horizontally transversely of said grid bars at a speed in the order of from about 175 to about 200 cycles per minute and with such a throw as first to cause said vegetables to settle through the spaces between said grid bars and then to sever the pendant vegetables from the plants due to the inertia of the vegetables, and means arranged below said grid to catch and convey away the severed vegetables.

2. In a harvester for vegetables of the tomato and cucumber families and which are growing on their plants, a supporting structure, a plurality of generally horizontal and parallel grid bars transversely spaced a distance sufficient to permit the vegetables on said plants to settle therethrough, rigid frame means connecting opposite ends and extending along opposite sides and lengthwise of said grid bars to form a rigid grid, means feeding a succession of said plants bearing said vegetables onto one end of said grid in a direction generally lengthwise of said grid bars, a pair of transversely spaced endless chains mounted to travel about spaced horizontal axes above and adjacent the opposite ends of said grid bars, cross members connecting said chains, conveyor fingers projecting radially outwardly from said cross members on rounding said axes and of such length as to project downwardly from the lower stretches of said chains and penetrate the plants so fed into said grid, means driving said chains to move their lower stretches in a direction away from said feeding means, a plurality of stripper bars fixed to said frame between said conveyer cross members and grid bars and extending lengthwise of said grid bars among said conveyer fingers and through the spaces between which said conveyer fingers withdraw to a position above said stripper bars on leaving the plants being conveyed, thereby to strip off any plants tending to cling to the conveyer fingers, means supporting said grid on said supporting structure for horizontal reciprocation transversely of said grid bars, means arranged to reciprocate said grid horizontally and transversely of said grid bars at a speed in the order of 175 to 200 cycles per minute and with a throw of about four inches to cause said vegetables first to settle through the spaces between said grid bars and then to sever the pendant vegetables from the plants due to the inertia of the vegetables, and means arranged to catch and carry away the severed vegetables.

3. In a harvester for vegetables of the tomato and cucumber families and which are growing on their plants, a supporting structure, a plurality of generally horizontal and parallel elongated supports transversely arranged to provide a support for said plants and transversely spaced a distance to permit the vegetables on said plants to settle therethrough, means feeding a succession of said plants bearing vegetables onto corresponding ends of said elongated supports in a direction generally lengthwise of said elongated supports, conveyer means continuing the movement of said plants bearing said vegetables lengthwise of said elongated supports, means arranged to reciprocate said elongated supports as a group horizontally and transversely at a speed in the order of from about 175 to about 200 cycles per minute and with such a throw as to cause said vegetables first to settle through the spaces between said elongated supports and then to sever the pendant vegetables from the plants due to the inertia of the vegetables and means arranged below said elongated supports to catch and convey away the severed vegetables.

4. In a harvester for vegetables of the tomato and cucumber families and which are growing on their plants, a supporting structure, a plurality of generally horizontal and parallel elongated supports transversely arranged in a common generally horizontal plane and transversely spaced a distance to permit the vegetables on said plants to settle therethrough, means feeding a succession of said plants bearing vegetables onto corresponding ends of said elongated supports in a direction generally lengthwise of said elongated supports, conveyer means continuing the movement of said plants bearing said vegetables lengthwise of said elongated supports, means arranged to reciprocate said elongated supports as a group horizontally and transversely at a speed in the order of from about 175 to about 200 cycles per minute and with such a throw as to cause said vegetables first to settle through the spaces between said elongated supports and then to sever the pendant vegetables from the plants due to the inertia of the vegetables, an endless conveyer belt having a generally horizontal upper stretch arranged below said elongated supports to provide a moving resilient surface on which said vegetables fall, a second endless belt having an upwardly moving upper inclined stretch arranged to receive the vegetable released the discharge end of said first mentioned endless conveyer, said upwardly moving upper inclined stretch being arranged at such an angle that the vegetables roll to its bottom while the leaves and other trash are carried upwardly over the top of the second belt.

References Cited in the file of this patent
UNITED STATES PATENTS

| | | |
|---|---|---|
| 2,010,335 | Stoltenberg | Aug. 6, 1935 |
| 2,269,298 | Widuch | Jan. 6, 1942 |
| 2,369,723 | Denlinger | Feb. 20, 1945 |
| 2,513,155 | Dvorak | June 27, 1950 |
| 2,554,753 | Prather | May 29, 1951 |
| 2,903,839 | Grew | Sept. 15, 1959 |
| 2,921,637 | Danielsson | Jan. 19, 1960 |